United States Patent
Forbes et al.

(10) Patent No.: US 9,002,744 B2
(45) Date of Patent: Apr. 7, 2015

(54) METHODS, SYSTEMS AND COMPUTER PROGRAM PRODUCTS FOR DETERMINING USAGE RIGHTS FOR DIGITAL CONTENT BASED ON CHARACTERIZING INFORMATION THEREOF AND RELATED DEVICES

(75) Inventors: Stephen Kight Forbes, Raleigh, NC (US); Paul H. Nichols, Raleigh, NC (US); Vikram Makam Gupta, Raleigh, NC (US); Jeffrey J. Griffin, Raleigh, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1425 days.

(21) Appl. No.: 11/460,705

(22) Filed: Jul. 28, 2006

(65) Prior Publication Data

US 2008/0027867 A1    Jan. 31, 2008

(51) Int. Cl.
*G06F 21/00* (2013.01)
*G06F 21/10* (2013.01)

(52) U.S. Cl.
CPC ..................................... *G06F 21/10* (2013.01)

(58) Field of Classification Search
USPC ........................................ 705/51, 52; 726/26
See application file for complete search history.

(56) References Cited

U.S. PATENT DOCUMENTS

| | | | |
|---|---|---|---|
| 4,755,889 A * | 7/1988 | Schwartz | 360/32 |
| 5,715,403 A | 2/1998 | Stefik | |
| 6,697,948 B1 * | 2/2004 | Rabin et al. | 726/30 |
| 6,983,371 B1 * | 1/2006 | Hurtado et al. | 713/189 |
| 2002/0065832 A1 | 5/2002 | Mack | |
| 2002/0112171 A1 * | 8/2002 | Ginter et al. | 713/185 |
| 2002/0129140 A1 * | 9/2002 | Peled et al. | 709/224 |
| 2003/0028490 A1 | 2/2003 | Miura et al. | |
| 2005/0131831 A1 | 6/2005 | Fieldson | |
| 2006/0200865 A1 * | 9/2006 | Leake et al. | 726/27 |
| 2006/0212704 A1 * | 9/2006 | Kirovski et al. | 713/176 |
| 2006/0288002 A1 * | 12/2006 | Epstein et al. | 707/6 |

FOREIGN PATENT DOCUMENTS

| | | |
|---|---|---|
| EP | 1 386 493 A1 | 2/2004 |
| JP | 2003-157334 A | 5/2003 |
| WO | WO 03/013141 A1 | 7/2002 |
| WO | WO 2004/079490 A2 | 9/2004 |
| WO | WO 2004/079545 A2 | 9/2004 |

OTHER PUBLICATIONS

International Search Report and Written Opinion for PCT/US2007/003080 mailed Jul. 30, 2007.

\* cited by examiner

*Primary Examiner* — Tsan-Yu J Huang
(74) *Attorney, Agent, or Firm* — Myers Bigel Sibley & Sajovec, P.A.

(57) ABSTRACT

A method for controlling unauthorized use of digital content includes identifying digital content for validation. Characterizing information is generated that designates the identified digital content, and usage rights for the identified digital content are determined based on the characterizing information, for example, based on a comparison of the characterizing information that designates the identified digital content to a plurality of characterizing information. Usage of the identified digital content may also be controlled based on the determined usage rights. Related systems, methods, devices, and computer program products are discussed.

22 Claims, 6 Drawing Sheets

METHODS, SYSTEMS AND COMPUTER PROGRAM PRODUCTS FOR DETERMINING USAGE RIGHTS FOR DIGITAL CONTENT BASED ON CHARACTERIZING INFORMATION THEREOF AND RELATED DEVICES

FIELD OF THE INVENTION

The present invention relates to communication networks, and more specifically, to the access and/or distribution of digital content over communication networks.

BACKGROUND OF THE INVENTION

Digital media products may be widely used for entertainment, education, and/or other purposes. As used herein, the term 'digital media' may include digital audio, digital video, and/or digital images which may be embodied in digital media products including, for example, compact discs, digital video discs, video game products, digital television products, memory devices that include digital media files, and/or digital media files that may be distributed over computer networks, such as the World Wide Web and/or other wireless and/or mobile networks, via satellite, and/or via cable networks.

With the proliferation of digital media products, concerns have been raised by owners of copyright and/or other intellectual property rights in digital media products. These concerns have led to the use and/or proposal of Digital Rights Management (DRM) technologies. DRM provides for secure distribution of digital content. DRM technologies may enable authorized users of a digital media product use the product, and may include the ability to copy the product under certain circumstances. DRM technologies may also prohibit unauthorized uses by the authorized users, such as sending the digital media product by email and/or publishing the digital media on the worldwide web, and may also prohibit use by unauthorized users. The basic components of DRM technology may include the digital media content, which may be transferred between the content provider and a user in a secure fashion, and the rights, which may represent the permissions, obligations, and/or constraints associated with the use of the digital media content. For example, the rights may take the form of a separate "key" that may be required to be available to a multimedia device in order to enable rendering of the digital media content.

There may be a relatively small percentage of individuals who can successfully bypass the DRM mechanisms on a multimedia device and/or the copy protection constraints placed on digital media content. However, when one of these "pirates" successfully bypasses such copy protection constraints and provides a copy of the digital multimedia content on a publicly accessible network, such as the Internet, there may be a significantly larger percentage of individuals who may be skilled enough to locate and download the "cracked" digital content. These "lazy pirates" may lack the skills and/or motivation to actually bypass DRM mechanisms, but may be responsible for most of the unauthorized access and/or distribution of protected digital content.

SUMMARY OF THE INVENTION

According to some embodiments of the present invention, a method for controlling unauthorized use of digital content includes identifying digital content for validation, generating characterizing information that designates the identified digital content, and determining usage rights for the identified digital content based on the characterizing information. For example, a database including a plurality of characterizing information and a respective plurality of usage rights corresponding thereto may be accessed, and the usage rights for the identified digital content may be determined based on a comparison of the characterizing information that designates the identified digital content to the plurality of characterizing information.

In some embodiments, the database may be accessed by transmitting the characterizing information that designates the identified digital content to a validation server coupled to the database. A notification may be received from the validation server indicating and/or including the determined usage rights for the identified digital content.

In other embodiments, the plurality of characterizing information in the database may be a plurality of digital signatures generated using a predetermined algorithm. As such, the characterizing information that designates the identified digital content may be a digital signature that designates the identified digital content. The digital signature may be generated using the predetermined algorithm.

In some embodiments, the characterizing information that designates the identified digital content may be compared to a plurality of characterizing information having a plurality of usage rights respectively corresponding thereto, and the usage rights for the identified digital content may be determined based on the comparison.

In other embodiments, the characterizing information that designates the identified digital content may be received at a validation server that is configured to perform the comparison. A notification may be transmitted from the validation server indicating and/or including the determined usage rights for the identified digital content based on the comparison.

In some embodiments, the plurality of characterizing information may respectively designate a plurality of protected media content. The identified digital content may be determined to correspond to at least one of the plurality of protected media content based on the comparison, and the usage rights for the identified digital content may be determined based on the usage rights corresponding to the characterizing information that designates the at least one of the plurality of protected media content. The plurality of characterizing information may also designate unauthorized copies of the plurality of protected media content and/or known variants thereof.

In other embodiments, the plurality of protected media content may be obtained, for example, from a subscribing device. The plurality of characterizing information respectively designating the plurality of protected media content may be generated responsive to obtaining the protected media content, and a database may be populated with the plurality of characterizing information responsive to generation thereof.

In some embodiments, the plurality of protected media content and/or the plurality of characterizing information may be received from a subscriber device.

In other embodiments, the plurality of characterizing information may respectively designate a plurality of unwanted digital content. For example, the plurality of characterizing information may designate known viruses and/or trojan files. The identified digital content may be determined to correspond to at least one of the plurality of unwanted digital content based on the comparison, and the usage rights for the identified digital content may be determined based on the usage rights corresponding to the characterizing information that designates the at least one of the plurality of unwanted digital content. For instance, the determined usage rights may provide instructions for quarantine and/or deletion of the unwanted digital content.

In some embodiments, usage of the identified digital content may be allowed for a predetermined period of time and/or number of uses when the comparison of the characterizing information that designates the identified digital content to the plurality of characterizing information in the database does not indicate a match therebetween.

In other embodiments, usage of the identified digital content may be controlled based on the determined usage rights. For example, rendering of the identified digital content may be limited based on the determined usage rights. More particularly, the identified digital content may be altered based on the determined usage rights to limit rendering thereof. For instance, the identified digital content may be encoded to associate the determined usage rights therewith. In addition, instructions for obtaining a rights object and/or license configured to decode the encoded digital content may be provided.

In some embodiments, generating the characterizing information may include sampling a portion of a waveform representing the identified digital content.

In other embodiments, device information that identifies a device may be appended to the identified digital content responsive to determining the usage rights therefore As such, the device that has received the identified digital content may be identified based on the appended device information therein, and a party associated with the identified digital content may be notified of the identified device. For example, a chain of distribution for the identified digital content may be identified based on the appended device information, and a content owner of the identified digital content may be alerted of the infringing device(s).

In some embodiments, digital content identified as without valid usage rights associated therewith may be identified for validation. In addition, digital content identified as received and/or downloaded digital content may be identified for validation. Also, the digital content may be identified for validation based on identifying a file type thereof and the characterizing information may be generated based on the identified file type. For example, the characterizing information may be generated based on a predetermined start point and/or end point of the identified file type.

In other embodiments, the digital content may be identified for validation responsive to detecting receipt thereof and/or responsive to detecting a request to render the digital content.

According to other embodiments of the present invention, a method for controlling unauthorized use of digital content includes receiving characterizing information that designates digital content from a requesting device. The received characterizing information is compared to a plurality of characterizing information having a plurality of usage rights respectively corresponding thereto, and usage rights for the digital content designated by the received characterizing information are determined based on the comparison. The requesting device is notified of the determined usage rights for the digital content designated by the received characterizing information.

In some embodiments, the plurality of characterizing information may be stored in a database. More particularly, a plurality of digital content and the plurality of usage rights respectively corresponding thereto may be obtained, and the plurality of characterizing information that designates the plurality of digital content may be generated using a predetermined algorithm. The database may be populated with the plurality of characterizing information and the plurality of usage rights respectively corresponding thereto responsive to generation thereof.

In other embodiments, the requesting device may be notified of the predetermined algorithm prior to receiving the characterizing information therefrom.

In other embodiments, the requesting device may be instructed to limit usage of the digital content based on the determined usage rights.

According to further embodiments of the present invention, an electronic device includes a validation agent configured to identify digital content for validation. The validation agent is also configured to generate characterizing information that designates the identified digital content and determine usage rights for the identified digital content based on the characterizing information.

In some embodiments, the validation agent may be configured to access a database including a plurality of characterizing information and a respective plurality of usage rights corresponding thereto. The validation agent may be further configured to determine the usage rights for the identified digital content based on a comparison of the characterizing information designating the identified digital content to the plurality of characterizing information.

In other embodiments, the electronic device may further include a transmitter and a receiver. The transmitter may be configured to transmit the characterizing information that designates the identified digital content to a validation server coupled to the database. The receiver may be configured to receive a notification from the validation server indicating and/or including the determined usage rights for the identified digital content based on the comparison.

In some embodiments, the plurality of characterizing information in the database may be a plurality of digital signatures generated using a predetermined algorithm. The validation agent may be configured to generate a digital signature that designates the identified digital content using die predetermined algorithm. The predetermined algorithm may be specified by the validation server. For example, the predetermined algorithm may be a hashing algorithm, a cyclic redundancy check (CRC) algorithm, and/or a digital signal processing (DSP) characterization algorithm.

In other embodiments, the validation agent may be configured to generate the characterizing information by sampling a portion of a waveform representing the identified digital content.

In some embodiments, the validation agent may be configured to identify the digital content for validation based on a lack of valid usage rights associated therewith. In addition, the validation agent may be configured to identify the digital content for validation based on a file type thereof, and may be configured to generate the characterizing information based on the identified file type.

In other embodiments, the validation agent may be configured to allow unrestricted usage of the identified digital content when the comparison of the characterizing information designating the identified digital content to the plurality of characterizing information in the database does not indicate a match therebetween.

In some embodiments, the validation agent may be further configured to control usage of the identified digital content based on the determined usage rights. For example, the validation agent may be configured to limit rendering of the identified digital content based on the determined usage rights. More particularly, the validation agent may be configured to alter the identified digital content based on the determined usage rights to limit rendering thereof. For instance, the validation agent may be configured to encode the identified digital content to associate the determined usage rights therewith.

In some embodiments, the validation agent may be configured to append device information to the identified digital content based on the determined usage rights. The device information may identify a device that has received and/or downloaded the identified digital content.

According to still further embodiments of the present invention, a network device includes a database and a processor. The database is configured to store a plurality of characterizing information and a plurality of usage rights respectively corresponding thereto. The processor is configured to receive characterizing information that designates digital content, compare the received characterizing information to the plurality of characterizing information in the database, and determine usage rights for the digital content designated by the received characterizing information based on the comparison.

In some embodiments, the network device may further include a receiver and a transmitter. The receiver may be configured to receive the characterizing information from a requesting device. The transmitter may be configured to transmit a notification to the requesting device indicating and/or including the determined usage rights for the digital content designated by the received characterizing information.

In other embodiments, the receiver may be configured to receive a plurality of digital content and the plurality of usage rights respectively corresponding thereto. The processor may be configured to generate the plurality of characterizing information designating the plurality of digital content using a predetermined algorithm, and may be configured to populate the database with the plurality of characterizing information and the plurality of usage rights respectively corresponding thereto.

In some embodiments, the transmitter may be further configured to transmit an identification of the predetermined algorithm to the requesting device of prior to receipt of the characterizing information therefrom.

In other embodiments, the receiver may be configured to receive a plurality of digital content and/or the plurality of characterizing information designating the plurality of digital content from a subscriber device.

In some embodiments, the transmitter may be further configured to transmit instructions to the requesting device to limit usage of the digital content based on the determined usage rights therefor.

In other embodiments, the plurality of characterizing information may respectively designate a plurality of protected media content. The processor may be configured to determine that the digital content designated by the received characterizing information corresponds to at least one of the plurality of protected media content based on the comparison. In addition, the processor may be configured to determine the usage rights for the digital content designated by the received characterizing information based on the usage rights corresponding to the characterizing information that designates the at least one of the plurality of protected media content. The plurality of characterizing information may also designate unauthorized copies of the plurality of protected media content and/or known variants thereof.

In some embodiments, the plurality of characterizing information may respectively designate a plurality of unwanted digital content, such as spam, viruses, and/or trojan files. The processor may be configured to determine that the digital content designated by the received characterizing information corresponds to at least one of the plurality of unwanted digital content based on the comparison. The processor may be further configured to determine the usage rights for the digital content designated by the received characterizing information based on the usage rights corresponding to the characterizing information that designates the at least one of the plurality of unwanted digital content. For example, the processor may determine that the unwanted digital content should be quarantined and/or deleted based on the comparison.

Although described above primarily with respect to method and device aspects, it will be understood that the present invention may be embodied as methods, systems, electronic devices, and/or computer program products.

DETAILED DESCRIPTION OF EMBODIMENTS OF THE INVENTION

Figure 1:
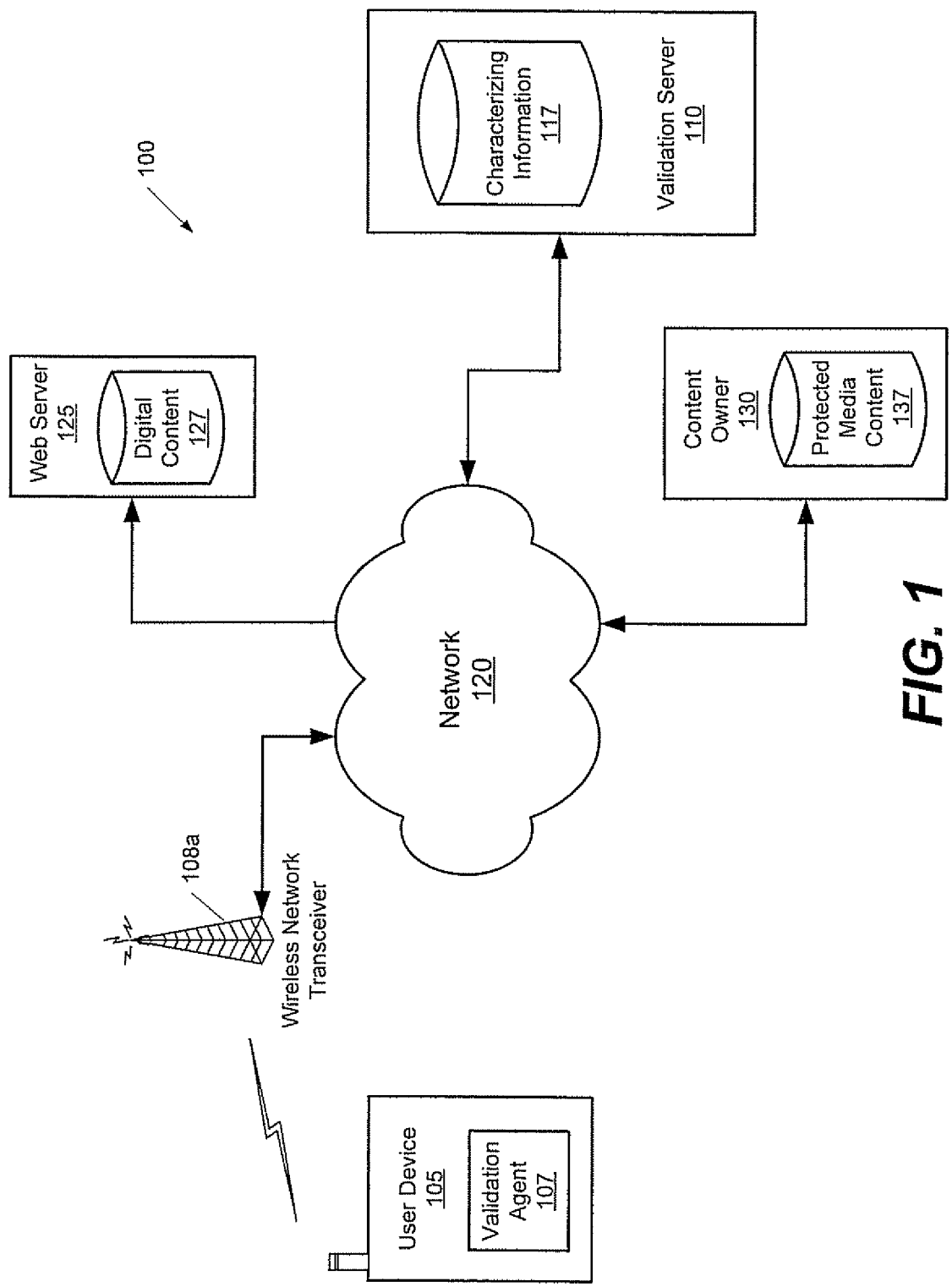
FIG. 1 is a block diagram illustrating systems and methods for controlling unauthorized use of digital content according to some embodiments of the present invention.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. In contrast, when an element is referred to as being "directly coupled" or "directly connected" to another element, there are no intervening elements present. Furthermore, "connected" or "coupled" as used herein may include wirelessly connected or coupled. As used herein, the term "and/or" includes any and all combinations of one or more of the associated listed items, and may be abbreviated as "/".

It will also be understood that, although the terms first, second, etc. may be used herein to describe various elements, these elements should not be limited by these terms. These terms are only used to distinguish one element from another. For example, a first multimedia device could be termed a second multimedia device, and, similarly, a second multimedia device could be termed a first multimedia device without departing from the teachings of the disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

As will be appreciated by one of skill in the art, the present invention may be embodied as methods, systems, and devices. Accordingly, the present invention may be embodied in hardware and/or in software (including firmware, resident software, micro-code, etc.). Computer program code for carrying out operations of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package. The program code may execute entirely on a multimedia device or only partly on the multimedia device and partly on another device. In the latter scenario, the other device may be connected to the multimedia device through a wired and/or wireless local area network (LAN) and/or wide area network (WAN), or the connection may be made to an external computer (for example, through the Internet using an Internet Service Provider).

The present invention is described below with reference to flowchart illustrations and/or block and/or flow diagrams of methods, systems, and devices according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block and/or flow diagram block or blocks.

These computer program instructions may also be stored in a computer-readable memory that can direct a computer or other programmable processor to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processor to cause a series of operational steps to be performed on the computer or other programmable processor to produce a computer implemented process such that the instructions which execute on the computer or other programmable processor provide steps for implementing the functions or acts specified in the flowchart and/or block diagram block or blocks. It should also be noted that, in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Some embodiments of the present invention may arise from a realization that, to control access and/or distribution of protected content, it may be beneficial to validate newly received and/or other content that may be likely to contain copyrighted and/or otherwise protected content. For example, a representation or signature of newly downloaded content may be checked against a database of signatures of protected content, and the newly downloaded content may be identified as protected content based on a match between the signatures. As such, appropriate usage rights for the newly downloaded content may be determined and applied to limit and/or prevent unauthorized usage thereof.

FIG. 1 illustrates systems and methods for controlling unauthorized use of digital content according to some embodiments of the present invention. Referring now to FIG. 1, a validation system 100 includes a user device 105 that is configured to communicate with a web server 125 via one or more communications networks, such as network 120. The user device 105 may be, for example, a laptop computer, a notebook computer, a handheld computer, a personal communication system terminal, a personal digital assistants (PDA), a portable music player, and/or a radiotelephone. In addition, while the user device 105 is illustrated as a mobile device communicating with the network 120 via a wireless network transceiver 108a, the user device 105 may also be a stationary device, such as a desktop computer and/or other non-mobile device configured to communicate via a wired connection thereto. The network 120 may represent a global network, such as the Internet, and/or other publicly accessible networks. The network 120 may also, however, represent a wide area network, a local network, an Internet, and/or other private networks, which may not be accessible by the general public. Furthermore, the network 120 may represent a combination of one or more wired and/or wireless public and/or private networks and/or virtual private networks (VPN).

The validation system 100 further includes a content owner 130 that is configured to communicate with a validation server 110 via one or more communications networks, such as the network 120. The content owner 130 may be, for example, a network device associated with a corporation and/or other entity that own copyrights and/or other intellectual property rights in media content that may be represented in digital form. As such, the content owner 130 may wish to prevent unauthorized usage and/or distribution of this protected media content, represented in FIG. 1 as stored in a database 137. Accordingly, the content owner 130 may register the protected media content with a validation service according to some embodiments of the present invention.

The validation service may include the validation server 110 and a validation agent 107 (included in the user device 105) configured to communicate over the network 120. The validation server 110 may include a database 117 including characterizing information that designates and/or represents particular digital content, as well as specific usage rights associated with the characterizing information and/or the digital content designated thereby. For example, the characterizing information stored in the database may designate and/or represent copyrighted, licensed, and/or otherwise protected media content, such as the protected media content stored in the database 137 of the content owner 130. More particularly, the content owner 130 may transmit the protected media content to the validation server 110 to register with the validation service. The validation server 110 may generate the characterizing information based on the protected media content and may populate the database 117 with the generated characterizing information. For example, the characterizing information may be digital signatures representing the protected media content, and may be generated using one or more predetermined algorithms. Examples of such algorithms may include hashing algorithms (such as SHA-1 and MD5), cyclic redundancy check (CRC) algorithms, and/or digital signal processing (DSP) algorithms. Such algorithms need not be discussed further herein. Accordingly, the characterizing information stored in the database 117 may respectively represent and/or designate protected media content files.

The characterizing information stored in the database 117 may also designate known unauthorized copies of the protected media content, such as unofficially released "bootleg" copies, and/or otherwise officially released/"genuine" copies of the protected media content whose copy protection and/or other technical protection measures have been altered and/or circumvented. For example, a pirate may successfully bypass the DRM mechanisms associated with the protected media content, and may provide the "ripped" content to a publicly accessible web server, such as the web server 125. In addition, the pirate may encode the protected media content with his own seemingly legitimate DRM wrapper prior to providing the content to the web server 125. Accordingly, the content owner 130 may locate such known unauthorized copies of the protected media content and/or variants thereof, and may provide these copies to the validation server 110. In addition, the content owner 130 may specify particular usage rights for the protected media content files and/or the known variants thereof, and the validation server 110 may store the usage rights with the corresponding characterizing information in the database 117. It is to be understood that, in some embodiments, the characterizing information designating the protected media content may be received directly from the content owner 130 and/or other subscriber device, and as such, may not be generated by the validation server 110.

Still referring to FIG. 1, the validation server 110 may be configured to compare the characterizing information stored in the database 117 to characterizing information received from the validation agent 107. The validation agent 107 may be a hardware and/or software device embedded in the user device 105, and may be configured to control usage of digital content therein. More particularly, the validation agent 107 may be configured to generate characterizing information that designates and/or represents identified digital content that is stored in the user device 105. For example, the user device 105 may download digital content, such as an MP3 file, from a database 127 in the web server 125 via the network 120. The MP3 file may not include copy protection and/or other DRM, and may thereby be accessed by the user device 105 without a license. As such, the validation agent 107 may identify the downloaded MP3 file as not having any usage rights currently associated therewith, and may proceed to validate the MP3 file with the validation server 110. More generally, the validation agent 107 may be configured to identify downloaded digital content files, digital content that does not currently include usage rights and/or restrictions on use, and/or other digital content that was not created at the user device 105 for validation, as such digital content may be more likely to include copyrighted, licensed, and/or otherwise protected media content.

Accordingly, the validation agent 107 may generate characterizing information that designates and/or represents the identified digital content. For example, the validation agent 107 may generate a digital signature that represents and/or designates the identified MP3 file using a predetermined algorithm that is specified by the validation server 110, which may be the same algorithm used to generate the characterizing information stored in the database 117. The validation agent 107 may be configured to generate the characterizing information responsive to detecting receipt of the digital content and/or responsive to detecting a request to render the digital content. The validation agent 107 may also permit "trial" usage of the downloaded MP3 file for a predetermined period of time and/or uses, and as such, may generate the characterizing information only upon detecting a subsequent request to use the digital content. In addition, the validation agent 107 may generate the characterizing information based on identifying the file type for the digital content. For example, for the downloaded MP3 file, the validation agent 107 may generate the characterizing information based on a predetermined start point and/or a predetermined endpoint of the MP3 file format.

Based on this characterizing information, the validation agent 107 may be configured to determine usage rights for the identified digital content. For example, the validation agent 107 may be configured to access the database 117 in the validation server 110, and may be configured to determine the usage rights for the identified digital content based on a comparison of the characterizing information designating the identified digital content to the characterizing information stored in the database 117. More particularly, the validation agent 107 may be configured to transmit the characterizing information designating the identified digital content to the validation server 110 via the network 120. The validation server 110 may compare the received characterizing information to the characterizing information stored in the database 117, and may determine the usage rights for the identified digital content based on the comparison.

More specifically, as the characterizing information stored in the database 117 designates protected media content files, the validation server 110 may determine whether the identified digital content includes and/or corresponds to one or more of the protected media content files based on the comparison of the characterizing information designating the identified digital content to the characterizing information in the database 117. For instance, if the digital signature designating the downloaded MP3 file received from the validation agent 107 matches one or more of the digital signatures stored in the database 117, the validation server 110 may identify the MP3 file stored at the user device 105 as a copy of the protected media content represented by the matching digital signature. As such, the validation server 110 may determine usage rights for the downloaded MP3 file based on the usage rights corresponding to the matching digital signature stored in the database 117 and/or the protected media content designated thereby.

In addition, as the characterizing information stored in the database 117 may also designate unauthorized copies of the protected media content and/or known variants thereof (such as "bootlegs" of the protected media content and/or copies of the protected media content whose DRM mechanisms have been altered and/or circumvented), the validation server 110 may also determine whether digital content stored on the user device 105 corresponds to such unauthorized copies based on characterizing information designating the digital content provided by the validation agent 107. Accordingly, the validation server 110 may identify digital content stored on the user device 105 as copyrighted, licensed, and/or otherwise protected media content based on characterizing information that represents and/or designates the digital content, and may determine appropriate usage rights for the identified digital content based on the usage rights corresponding to matching characterizing information stored in the database 117.

Again referring to FIG. 1, the validation server 110 may also be configured to transmit a notification to the validation agent 107 in the user device 105 via the network 120 responsive to determining the usage rights. The notification may indicate the determined usage rights for the identified digital content. As such, responsive to receiving the notification from the validation server 110, the validation agent 107 may be configured to control usage of the identified digital content at the user device 105 based on the determined usage rights. For example, when the characterizing information designating the identified digital content does not match any of the characterizing information stored in the database 117, the validation agent 107 may allow unrestricted usage of the identified digital content at the user device 105. In other words, when the comparison with the database 117 does not indicate a match, the validation agent 107 may determine that the digital content stored on the user device 105 does not include and/or correspond to protected media content, and as such, may not impede usage thereof.

However, if the comparison of the characterizing information designating the identified digital content matches one or more of the characterizing information stored in the database 117, the validation agent 107 may limit and/or prevent usage of the digital content at the user device 105 based on the usage rights specified in the notification from the validation server 110. For example, when the identified digital content is determined to be a "genuine" copy of the protected media content (i.e., an officially released copy of the protected media content whose technical protection measures has been altered/circumvented), the validation agent 107 may be configured to provide limited or "trial" usage of the identified digital content at the user device 105. In addition, the validation agent 107 may be configured to provide instructions on how to obtain an authorized copy of the protected media content. In contrast, when the identified digital content downloaded by the user device 105 is determined to be a "bootleg" copy of the protected media content (i.e., a copy whose release has been unauthorized), the validation agent 107 may be configured to prevent rendering and/or other use of the identified digital content at the user device 105 altogether.

The validation agent 107 may be configured to control usage of the identified digital content at the user device 105 directly and/or indirectly. For example, the validation agent 107 may be configured to control and/or interfere with operation of a media player and/or other rendering hardware/software at the user device 105 to directly control usage of the digital content until a proper license to access the digital content is purchased. In addition, the validation agent 107 may be configured to control usage of the digital content indirectly, for example, by altering the digital content stored on the user device 105 to prevent rendering thereof. More particularly, the validation agent 107 may be configured to locally apply DRM to the identified digital content, for example, by encoding the identified digital content to associate the determined usage rights therewith. In other words, the validation agent 107 may be configured to "wrap" the identified digital content based on the determined usage rights at the user device 105, such that a rights object and/or license may be required to successfully render the identified digital content. For example, where the identified digital content is determined to be a "genuine" copy of the protected media content whose technical protection measures have been altered and/or circumvented, the validation agent 107 may obtain and re-apply the circumvented technical protection measures to the identified digital content at the user device 105, to thereby "restore" the digital content to be equivalent to an authorized copy of the protected media content. In addition, responsive to encoding the digital content, the validation agent 107 may provide instructions for obtaining a rights object and/or a proper license that may be used to decode the encoded digital content. As such, the validation agent 107 may not only limit unauthorized use of the identified digital content by the user device 105, but also by other devices to whom the user device 105 may distribute the identified digital content stored therein.

Moreover, the validation agent 107 may also be configured to append information that identifies the user device 105 to the identified digital content stored therein. For example, the validation agent 107 may be configured to imprint the user device's IMSI (International Mobile Station Identity), IMEI (International Mobile Equipment Identity), and/or other information that may be used to identify the user device 105 in a wrapper of the identified digital content file stored therein. As such, by examining the wrapper, a chain of distribution for the digital content can be determined. In other words, one or more devices, such as the user device 105, that have received the identified digital content may be identified based on the appended device information in the digital content file. Thus, the validation server 110 and/or the validation agent 107 may be configured to alert the content owner 130 (and/or other subscribers to the validation service) of the identities of infringing devices and/or the origin of the unauthorized digital content based on the appended device information.

Although FIG. 1 illustrates an exemplary system 100 for controlling unauthorized use of digital content, it will be understood that the present invention is not limited to such configurations, but is intended to encompass any configuration capable of carrying out the operations described herein. For example, although illustrated in FIG. 1 as included in the user device 105, the validation agent 107 may also be included in other network devices, such as the web server 125, and may thus similarly control usage of digital content stored therein as described above. Likewise, although illustrated in FIG. 1 as included in the validation server 110, the database 117 may be included in other network devices, and/or may be included as part of the validation agent 107. In addition, the validation agent 107 may be updated via the network 120, for example, using known techniques. More generally, while particular blocks having particular functionalities are shown in FIG. 1 by way of illustration, functionalities of particular blocks thereof may be combined, divided, and/or eliminated.

In addition, although primarily described herein with reference to digital signatures, other types of characterizing information may be generated by the validation agent 107 to designate the identified digital content. For example, the validation agent 107 may be configured to sample a portion of a waveform that represents the identified digital content to provide the characterizing information. As such, the validation server 110 may compare the sampled portion of the waveform to portions of waveforms stored in the database 117 that designate protected media content, and may thereby determine the usage rights for the identified digital content as described above.

Moreover, while FIG. 1 illustrates a validation service for preventing unauthorized use of protected media content, the validation service may be configured to limit and/or prevent the use of other digital content as well. For example, in some embodiments, the validation server 110 may obtain and populate the database 117 with characterizing information designating known unwanted digital content files, such as spam, viruses, and/or trojan files. As such, by comparing characterizing information received from the validation agent 107 at the user device 105 with the characterizing information stored in the database 117, the validation server 110 may determine whether the digital content at the user device 105 includes one or more of the unwanted digital content files. If so, the validation server 110 may determine appropriate usage rights and instruct the validation agent 107 to limit and/or prevent usage of the digital content at the user device 105 accordingly. More particularly, the validation server 110 may instruct the validation agent 107 to quarantine and/or delete the unwanted digital content.

Figure 2:
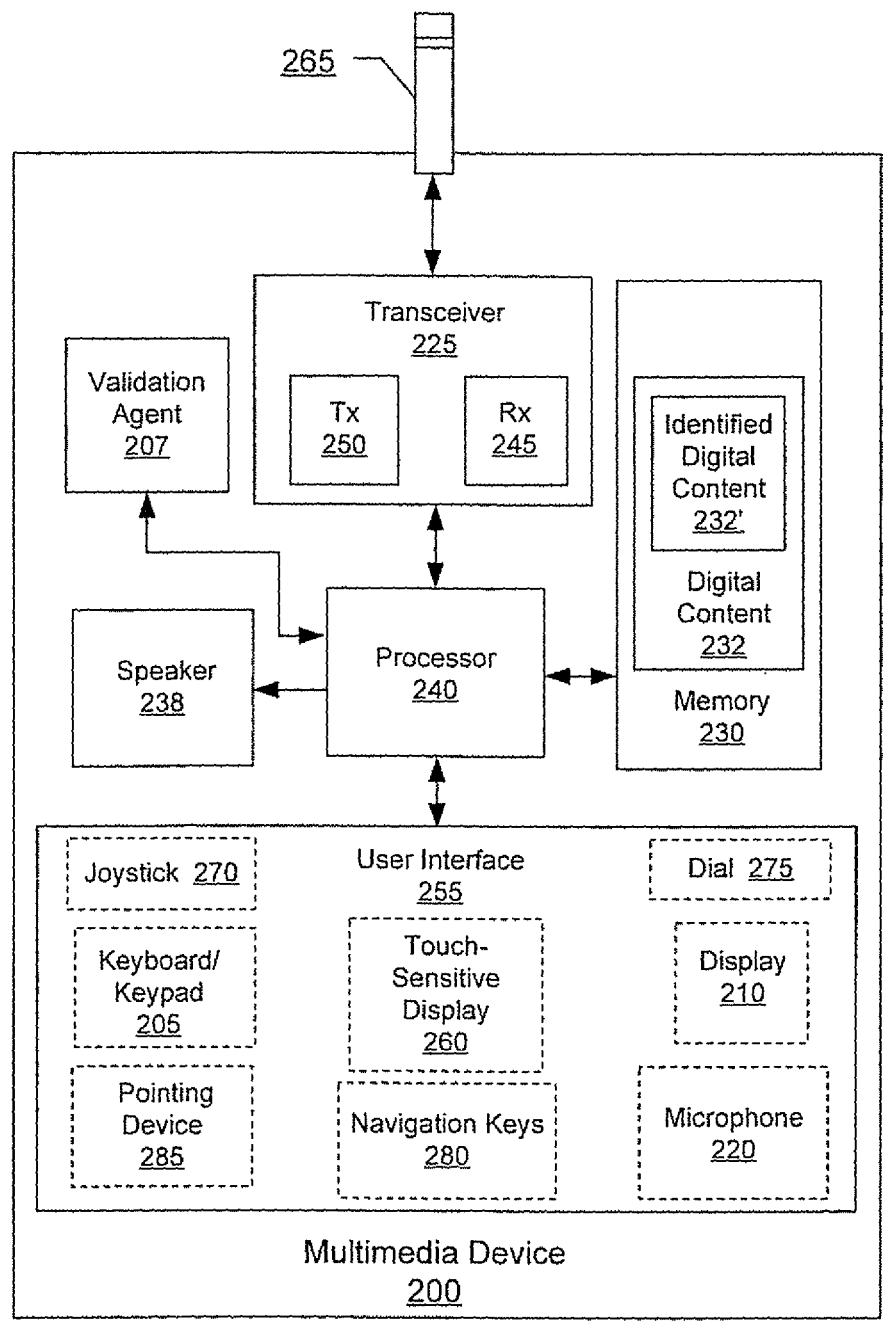
FIG. 2 is a block diagram illustrating a multimedia device configured to control unauthorized use of digital content according to some embodiments of the present invention.

FIG. 2 is a block diagram illustrating a multimedia device 200 configured to limit unauthorized use of digital content according to some embodiments of the present invention. In some embodiments, the multimedia device 200 may correspond to the user device 105 of FIG. 1. As shown in FIG. 2, the multimedia device 200 includes a transceiver 225, an antenna 265, a processor 240, a memory device 230, a speaker 238, and a user interface 255. The user interface 255 may include a microphone 220, a display 210 (such as a liquid crystal display), a joystick 270, a keypad 205, a touch-sensitive display 260, a dial 275, navigation keys 280, and/or a pointing device 285 (such as a mouse, trackball, touchpad, etc.), depending on the functionalities of the multimedia device 200. As such, additional and/or fewer elements of the user interface 255 may actually be provided.

The transceiver 225 includes a transmitter circuit 250 and a receiver circuit 245, which transmit and receive radio frequency signals via the antenna 265. The radio frequency signals may include both traffic and control signals (e.g., paging signals/messages for incoming calls), which may be used to establish and maintain communication with other devices. The processor 240 is coupled to the transceiver 225, the memory 230, the speaker 238, and the user interface 255. The processor 240 may be, for example, a commercially available or custom microprocessor configured to coordinate and manage operations of the transceiver 225, the memory 230, the speaker 238, and/or the user interface 255.

The memory 230 may represent a hierarchy of memory that may include volatile and/or nonvolatile memory, such as removable flash, magnetic, and/or optical rewritable nonvolatile memory. As shown in FIG. 2, the memory 230 may also be configured to store digital content 232 which may be downloaded to the multimedia device 200, for example, from a server, such as the web server 125 of FIG. 1, and/or from a removable memory and/or other communication port. The foregoing components of the multimedia device 200 of FIG. 2 need not be discussed further herein.

Still referring to FIG. 2, the multimedia device 200 also includes a validation agent 207. The validation agent 207 may be configured to identify particular ones 232' of the digital content files 232 stored in the memory 230 for validation by a validation service, and generate characterizing information that designates and/or represents the identified digital content files. For example, the identified digital content files 232' may include digital content files that do not currently include usage rights and/or restrictions on use, downloaded digital content files, and/or other digital content files that were not created at the multimedia device 200, as such digital content may be more likely to include copyrighted, licensed, and/or otherwise protected media content. However, in some embodiments, the validation agent 207 may identify all downloaded digital content for validation, regardless of the presence of usage rights, In addition, the validation agent 207 may be configured to identify the digital content files 232' for validation based on a particular file type. For example, MPEG files, MP3 files, and/or other audio and/or video files may be likely to contain protected media content, and may thus be identified for validation by the validation agent 207. As such, the validation agent 207 may distinguish particular ones 232' of the digital content files 232 stored in the memory 230 of the multimedia device 200 for validation.

After identifying one or more 232' of the digital content files 232 for validation, the validation agent 207 may generate characterizing information that designates the identified digital content files 232'. For example, the validation agent 207 may be configured to generate digital signatures that respectively designate the identified digital content files 232' using a predetermined algorithm, such as a hashing algorithm, a CRC algorithm, and/or a DSP characterization algorithm. The predetermined algorithm may be specified by a validation server, such as the validation server 110, which may include a database of characterizing information generated using the same predetermined algorithm. The validation agent 207 may also generate the characterizing information designating the digital content based on the file type. For example, after identifying particular digital content as MPEG video, the validation agent 207 may generate the characterizing information based on a predetermined start point and/or a predetermined endpoint according to the MPEG video standard. In addition, the validation agent 207 may be configured to generate the characterizing information by sampling a portion of a waveform that represents the digital content 232. Also, where the identified digital content files 232' already include some associated usage rights (even if illegitimate), the characterizing information may be generated to represent a combination of the digital content files 232' including the respective associated usage rights.

The validation agent 207 is further configured to determine usage rights for the identified digital content 232' based on the generated characterizing information. More particularly, the validation agent 207 may determine the usage rights by accessing a database including a plurality of characterizing information and a respective plurality of corresponding usage rights, such as the database 117 of FIG. 1. For example, the characterizing information stored in the database may be digital signatures, which respectively designate particular protected media content files and/or known unauthorized copies thereof. The validation agent 207 may thereby determine the usage rights for the identified digital content 232' by accessing the database and comparing the characterizing information designating the identified digital content 232' to the characterizing information stored in the database. More particularly, the validation agent 207 may transmit the characterizing information designating the identified digital content 232' to a validation server that is coupled to the database, such as the validation server 110, via the transmitter 250. The validation server may be configured to perform the comparison between the received characterizing information and the plurality of characterizing information stored in the database, and may determine usage rights for the identified digital content 232' based on the usage rights corresponding to any matching characterizing information stored in the database.

The validation server may then transmit the results of the comparison and/or the determined usage rights to the validation agent 207 via the receiver 245. As such, the receiver 245 may be configured to receive a notification from the validation server indicating the determined usage rights for the identified digital content 232' based on the comparison.

The validation agent 207 may be further configured to control usage of the digital content 232 on the multimedia device 200 based on the determined usage rights. For example, the validation agent 207 may be configured to allow unrestricted usage of the identified digital content 232' when the comparison of the characterizing information designating the identified digital content 232' to the characterizing information in the database does not indicate a match therebetween. However, if the comparison indicates a match between the characterizing information designating the identified digital content 232' and the characterizing information designating protected media content in the database, the validation agent 207 may be configured to limit and/or prevent usage of the identified digital content 232' at the multimedia device 200. For example, the validation agent 207 may directly control usage of the identified digital content 232' on the multimedia device 200 by instructing the processor 240 to limit and/or prevent usage thereof. For instance, the validation agent 207 may be configured to allow "trial" usage of the identified digital content 232' when it is determined that the identified digital content 232' is a "genuine" copy of the protected media content, such as a copy of the protected media content whose technical protection measures have been circumvented. In addition, the validation agent 207 may instruct the processor 240 to completely prevent rendering of the identified digital content 232' when it is determined that the identified digital content 232' includes an unauthorized and/or "bootleg" copy of the protected media content based on accessing the database.

In addition, the validation agent 207 may be configured to indirectly control usage of the identified digital content 232' on the multimedia device 200, for example, by altering the identified digital content 232' based on the determined usage rights to limit rendering thereof. More particularly, the validation agent 207 may be configured to locally apply DRM to encode the identified digital content 232' with the determined usage rights. For example, where the identified digital content 232' is determined to be a "genuine" copy of the protected media content whose technical protection measures have been circumvented, the validation agent 207 may obtain and locally reinstate the circumvented technical protection measures by encoding the identified digital content 232 at the multimedia device 200. In other words, the validation agent 207 may "wrap" the identified digital content 232' based on the determined usage rights at the multimedia device 200, such that the multimedia device 200 (and/or other devices) may no longer be able to render the identified digital content 232' without obtaining a rights object and/or proper license to decode the encoded digital content. The validation agent 207 may be further configured to provide instructions for obtaining such a rights object and/or license to a user of the multimedia device 200 via the user interface 255. As such, the validation agent 207 may identify particular ones 232' of the digital content 232 as including protected media content, and may appropriately control usage thereof according to usage rights that may be specified by the content owner.

In addition, the validation agent 207 may be configured to append information that may be used to identify the multimedia device 200 to the identified digital content 232'. For example, the validation agent 207 may be configured to imprint the multimedia device's IMSI, IMEI, and/or other identifying information in wrappers of the identified digital content files 232'. As such, by examining the device information in the wrappers of the identified digital content 232' a chain of distribution for the identified digital content 232' may be determined. The validation agent 207 may thereby alert a content owner, such as the content owner 130 of FIG. 1, of the devices that have received and/or distributed their protected media content.

Furthermore, in some embodiments, the multimedia device 200 may be a network device, such as the web server 125 of FIG. 1, that is configured to provide access to digital content stored therein. As such, upon receiving digital content for distribution, a validation agent in the network device may verify that the received digital content does not correspond to protected media content, as described above. Thus, unauthorized copies of protected media content may be identified and appropriate usage rights may be applied thereto at the network device itself, prior to distribution.

Although FIG. 2 illustrates an exemplary multimedia device 200 configured to control unauthorized use of digital content according to some embodiments of the present invention, it will be understood that the present invention is not limited to such a configuration but is intended to encompass any configuration capable of carrying out the operations described herein. For example, although illustrated as a mobile device including an antenna 265 and a transceiver 225 configured to receive radio frequency signals, the multimedia device 200 may be a stationary and/or otherwise non-mobile device, and the transceiver 225 may be a conventional wireline transceiver configured to receive and transmit signals via a wired connection. In addition, although the validation agent 207 and the processor 240 are illustrated as separate blocks, the functions of the validation agent 207 may be performed by the processor 240 in some embodiments. More generally, while particular functionalities are shown in particular blocks by way of illustration, functionalities of different blocks and/or portions thereof may be combined, divided, and/or eliminated.

Figure 3:
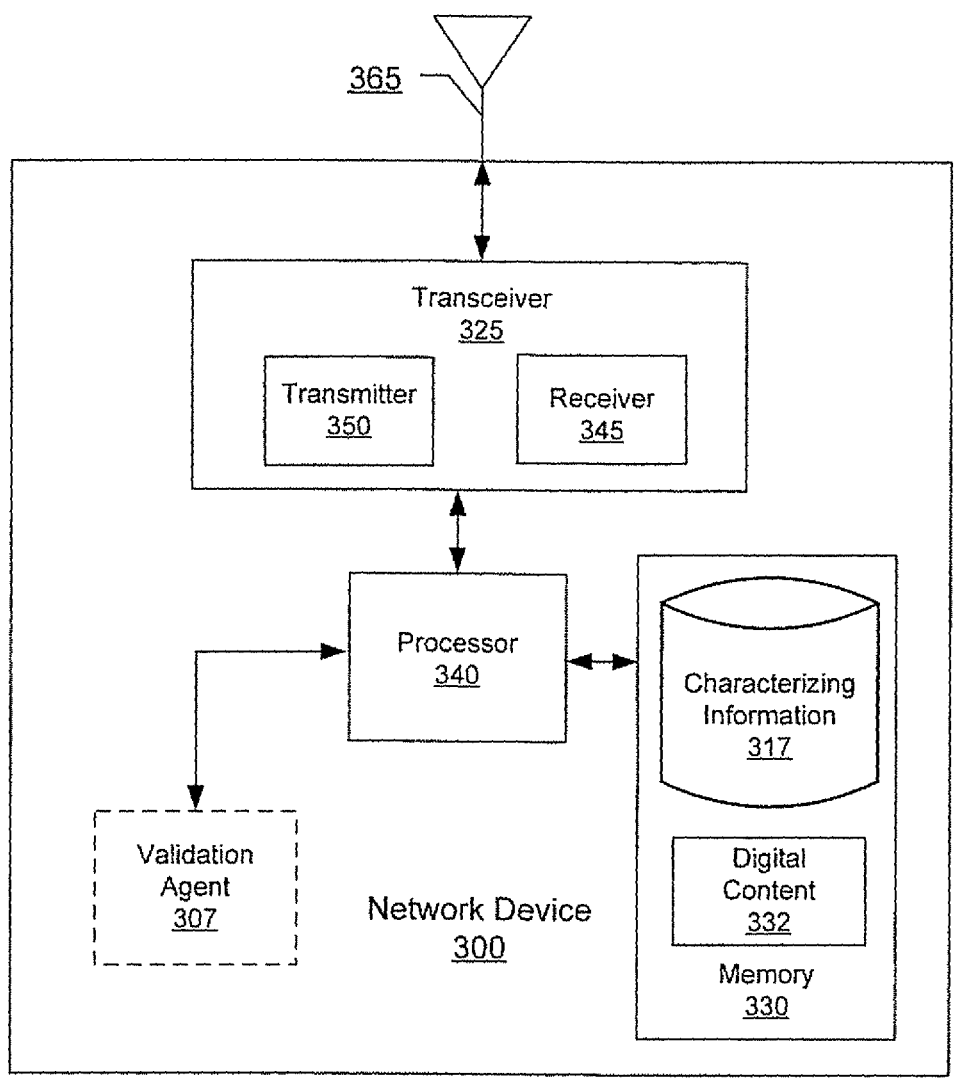
FIG. 3 is a block diagram illustrating a network device configured to control unauthorized use of digital content according to some embodiments of the present invention.

FIG. 3 is a block diagram illustrating a network device configured to control unauthorized use of digital content according to some embodiments of the present invention. In some embodiments, the network device 300 may correspond to the validation server 110 and/or the web server 125 of FIG. 1. Referring now to FIG. 3, the network device 300 includes a processor 340 coupled to a memory 330, a validation agent 307, and a transceiver 325. The processor 340 may be, for example, a commercially available and/or custom microprocessor that is configured to coordinate and manage operations of the transceiver 325, the memory 330, and the validation agent 307. The transceiver 325 may be a wireless transceiver including a transmitter circuit 350 and a receiver circuit 345 configured to transmit and receive radio frequency signals via an antenna 365. However, the transceiver 325 may also be a wireline transceiver configured to transmit and receive signals over a wired connection thereto. The memory 330 may represent a hierarchy of memory that may include volatile and/or non-volatile memory, such as removable flash, magnetic, and/or optical rewritable non-volatile memory.

The validation agent 307 may be a hardware and/or software device embedded in the network device 300, and may be configured to control usage of digital content therein. In some embodiments, the validation agent 307 may correspond to the validation agent 207 of FIG. 2, and as such, may be configured to identify digital content for validation, generate characterizing information designating the identified digital content, determine usage rights for the identified digital content, and control usage of the identified digital content based on the determined usage rights, as described above.

As further shown in FIG. 3, the memory 330 may include a database 317. The database 317 may include a plurality of characterizing information respectively designating and/or representing a plurality of digital content, and a plurality of corresponding usage rights for the digital content represented by the characterizing information. For example, the characterizing information stored in the database 317 may be a plurality of digital signatures generated from a plurality of protected media content files using a predetermined algorithm. For instance, the receiver 345 may be configured to receive the plurality of protected media content files and a plurality of corresponding usage rights from a content owner who wishes to subscribe to a validation service, such as the content owner 130 of FIG. 1. As such, the processor 340 may be configured to generate the characterizing information to respectively represent and/or designate the protected media content files using the predetermined algorithm, and may populate the database 317 with the characterizing information and the corresponding usage rights. However, in some embodiments, the receiver 345 may receive the characterizing information designating the protected media content directly from the content owner and/or other subscriber device, and the processor 340 may populate the database 317 with the plurality of characterizing information and the corresponding usage rights received from the content owner. The plurality of protected media content received from the content owner and/or the characterizing information stored in the database 317 may also designate known unauthorized copies of the protected media content and/or variants thereof, such as "bootleg" copies and/or "genuine" copies whose DRM mechanisms have been altered and/or circumvented, Accordingly, the processor 340 may be configured to receive characterizing information that designates particular digital content, and may compare the received characterizing information to the plurality of characterizing information stored in the database 317 to determine usage rights for the digital content. For example, the processor 340 may be configured to receive the characterizing information from a validation agent 307 included in the network device 300. More particularly, in some embodiments, the network device 300 may be a web server, such as the web server 125 of FIG. 1, that includes the validation agent 307 and the database 317 therein. As such, the network device 300 may be configured to receive digital content 332 via the receiver 345, and may store the received digital content 332 in the memory 330. The validation agent 307 may generate characterizing information representing and/or designating the received digital content 332, and may provide this characterizing information to the processor 340. The processor 340 may compare the received characterizing information to the plurality of characterizing information stored in the database 317 to determine whether the received digital content 332 corresponds to one or more of the protected media content files designated by the characterizing information stored in the database 317. In other words, the processor 340 may be configured to identify the received digital content 332 stored therein as protected media content (and/or unauthorized copies thereof) if the characterizing information designating the received digital content 332 matches the characterizing information stored in the database 317. If a match is detected, the processor 340 may determine usage rights for the received digital content 332 based on the usage rights corresponding to the matching characterizing information in the database 317, and may notify the validation agent 307 of the determined usage rights. More particularly, the processor 340 may transmit a notification to the validation agent 307 indicating and/or including the determined usage rights. The validation agent 307 may then apply the determined usage rights to the digital content to control further unauthorized use by devices that download the digital content from the network device 300.

In other embodiments, however, the network device 300 may not include the validation agent 307 therein. For example, the network device 300 may be a validation server, such as the validation server 110 of FIG. 1. As such, the processor 340 may be configured to receive characterizing information designating particular digital content from a requesting device, such as the user device 105 of FIG. 1, via the receiver 345. The processor 340 may also be configured to transmit an identification of the algorithm used to generate the characterizing information in the database 317 to the requesting device via the transmitter 350, so that the requesting device may generate its characterizing information using the same algorithm. Accordingly, the processor 340 may compare the characterizing information received from the requesting device to the plurality of characterizing information in the database 317 to determine the usage rights for the digital content stored in the requesting device, as discussed above. The transmitter 350 may then transmit a notification to the requesting device that indicates the determined usage rights for the digital content. The transmitter 350 may also transmit instructions to the requesting device to limit and/or prevent usage of the digital content based on the determined usage rights. As such, the network device 300 may not only be configured to determine appropriate usage rights for digital content received at other devices based on the characterizing information received therefrom, but may also be configured to control usage of the digital content at those devices.

Although FIG. 3 illustrates an exemplary network device 300 that may be configured to control unauthorized use of digital content according to some embodiments of the present invention, it will be understood that the present invention is not limited to such a configuration but is intended to encompass any configuration capable of carrying out the operations described herein. For example, although illustrated as including an antenna 365 and a transceiver 325 configured to receive radio frequency signals, the network device 300 may be a stationary and/or otherwise non-mobile network device, and the transceiver 325 may be a conventional wireline transceiver configured to receive and transmit signals via a wired connection. In addition, although described above with reference to protected media content, the database 317 may store a plurality of characterizing information representing and/or designating a plurality of unwanted digital content, such as viruses and/or trojan files. As such, the processor 340 may determine whether particular digital content includes and/or corresponds to such viruses and/or trojan files based on characterizing information that designates the particular digital content, and may determine usage rights specifying quarantine and/or deletion of such digital content accordingly.

Figure 4:
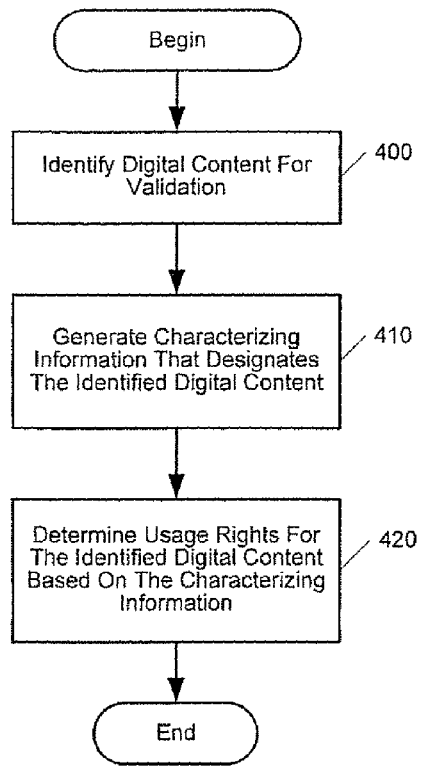
FIGS. 4-6 are flowcharts illustrating operations for controlling unauthorized use of digital content according to some embodiments of the present invention.

Example operations for controlling unauthorized use of digital content in accordance with some embodiments of the present invention will now be described with reference to the flowcharts of FIGS. 4-6. In particular, FIG. 4 is a flowchart illustrating operations for controlling unauthorized use of digital content which may be performed, for example, by a validation agent in a user device, such as the user device 105 of FIG. 1. Referring now to FIG. 4, operations begin at Block 400 when digital content is identified for validation. More particularly, digital content may be identified for validation based on a likelihood of including copyrighted, licensed, and/or otherwise protected media content. For example, digital content that does not include rights and/or restrictions on usage may be identified for validation. In addition, digital content that has been received, downloaded, and/or otherwise has not been created by an electronic device may be identified for validation. Moreover, in some embodiments, all digital content that has been downloaded to an electronic device may be identified for validation, regardless of the presence of usage rights and/or restrictions. Digital content may also be identified for validation based on file type. For example, video files, such as MPEG files, and/or audio files, such as MP3 files, may be identified for validation, as such files may be likely candidates for unauthorized use, especially if the files do not currently include usage rights. In some embodiments, the digital content may be identified for validation responsive to receipt of the digital content and/or responsive to detecting a request to render or otherwise use the digital content. As such, content that is more likely to include protected media content may be distinguished from other digital content, such as content created at an electronic device and/or installed on the electronic device during the manufacturing process.

Once the digital content has been identified for validation, characterizing information that designates and/or represents the identified digital content is generated at Block 410. For example, a digital signature that designates the identified digital content may be generated using a predetermined algorithm, such as a hashing algorithm, a CRC algorithm, and/or a DSP characterization algorithm. Also, the characterizing information may be generated based on the identified file type of the digital content. For example, characterizing information may be generated for MPEG files using a MD5 hashing algorithm, while characterizing information may be generated for MP3 files using a SHA-1 hashing algorithm. In addition and/or alternatively, the characterizing information may be generated by sampling a portion of a waveform that represents the identified digital content. For example, the sampled portion may be generated based on a predetermined start point and/or a predetermined endpoint based on the identified file type. In addition, where the identified digital content already includes some associated usage rights, the characterizing information may be generated to represent the combination of the identified digital content and the associated usage rights. More generally, the characterizing information may be any type of representation of the digital content that may be used to subsequently identify the digital content.

Still referring to FIG. 4, usage rights for the identified digital content are determined based on the characterizing information at Block 420. For example, the usage rights for the identified digital content may be determined based on a comparison of the characterizing information that designates the identified digital content to other characterizing information that is associated with particular usage rights. More particularly, a database including a plurality of characterizing information and a corresponding plurality of usage rights may be accessed, and the usage rights for the identified digital content may be determined based on a comparison of the characterizing information designating the identified digital content to the characterizing information in the database. For example, the characterizing information in the database may designate a plurality of protected media content files, such as copyrighted movies, music, and/or interactive games, and/or known unauthorized copies of the protected media content files, such as bootleg copies of movies, music whose technical protection measures have been altered/circumvented, and/or interactive games whose copy protection mechanisms have been removed. Accordingly, based on a match between the characterizing information designating the identified digital content and at least one of the plurality of characterizing information stored in the database, the digital content may be identified as including and/or corresponding to the copyrighted, licensed, and/or otherwise protected media content. As such, the usage rights for the identified digital content may be determined based on the usage rights corresponding to the matching characterizing information in the database. Also, where the identified digital content included some usage rights prior to validation, these previously associated usage rights may be verified based on the determined usage rights. For example, some DRM wrappers may include information about the content owner and/or a URL for downloading the rights. As such, after determining the usage rights for the identified digital content as described above, the pre-existing DRM wrapper could be verified as valid (ie., applied by the content owner rather than by a hacker or pirate) based on a comparison with the determined usage rights.

In addition, in some embodiments, the plurality of characterizing information in the database may designate a plurality of unwanted digital content, such as spam, viruses, and/or trojan files. Accordingly, based on a match with this characterizing information, usage rights specifying quarantine and/or deletion of the unwanted digital content may be determined. In other words, usage of the identified digital content may also be controlled based on the determined usage rights, as will be discussed in greater detail below.

Figure 5:
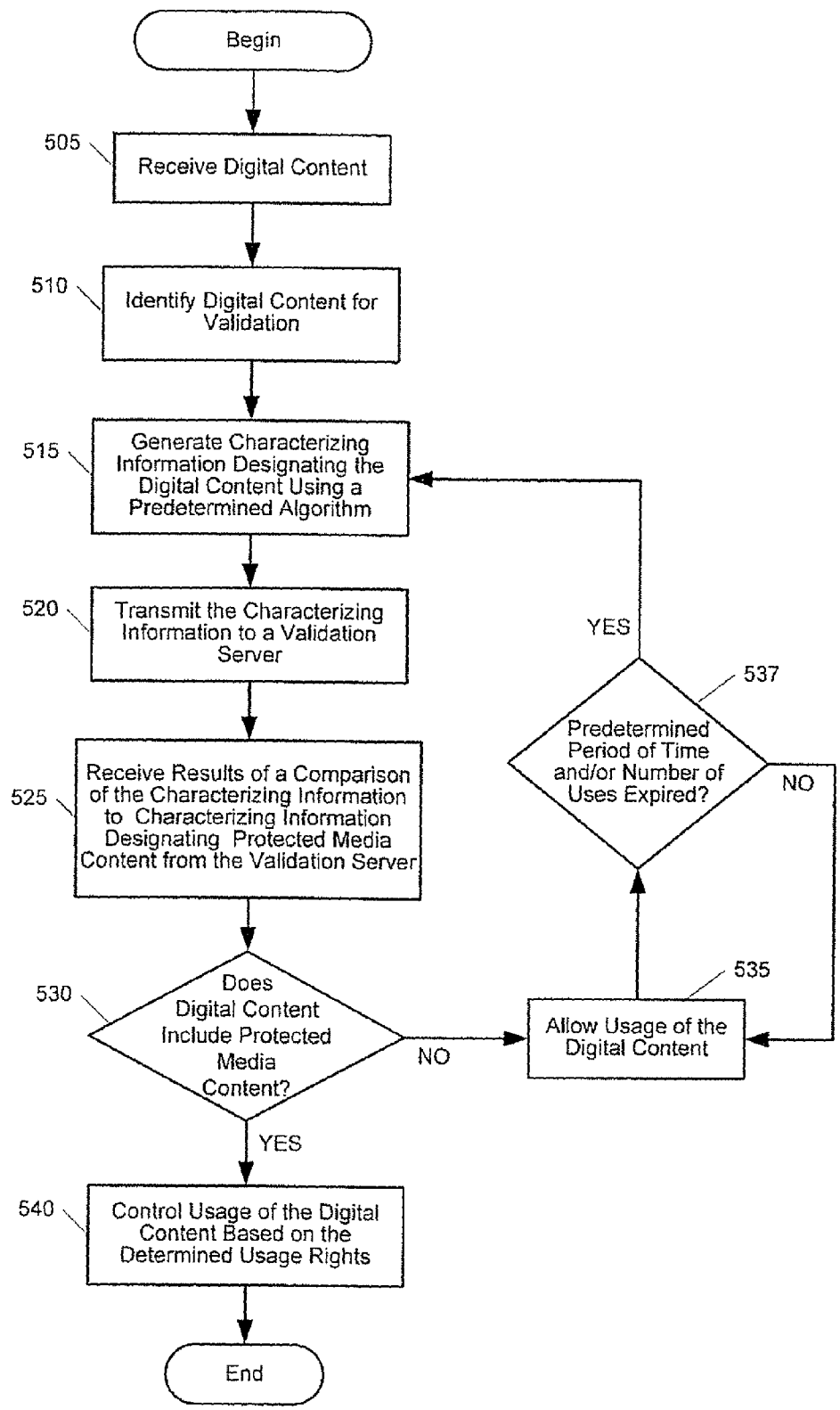

FIG. 5 is a flowchart illustrating more detailed operations for controlling unauthorized use of digital content according to some embodiments of the present invention. For example, the operations of FIG. 5 may be performed by a multimedia device, such as the multimedia device 200 of FIG. 2. Referring now to FIG. 5, operations begin at Block 505 when digital content is received at an electronic device. The digital content may include text, movies, music, and/or interactive games, and/or other media content that may typically be downloaded by electronic devices. At Block 510, the received digital content is identified for validation. For example, in some embodiments, the received digital content may be identified for validation based on whether the digital content includes usage rights and/or other restrictions on use. However, as discussed herein with reference to the embodiments of FIG. 5, all downloaded and/or otherwise received digital content may be identified for validation, regardless of the presence of associated usage rights. At Block 515, characterizing information representing and/or designating the digital content is generated using a predetermined algorithm. For example, the digital content may be hashed using a predetermined hashing algorithm to generate a digital signature thereof. In some embodiments, the predetermined algorithm used to generate the characterizing information may be specified by a validation server.

Still referring to FIG. 5, the characterizing information that designates the digital content is transmitted to a validation server at Block 520. The validation server may include a database of characterizing information that designates a plurality of protected media content files, such as copyrighted and/or licensed movies, music, and/or interactive games. The database may also specify particular usage rights corresponding to the characterizing information stored therein. As such, the characterizing information designating the received digital content may be compared to the characterizing information stored in the database, and if a match results, usage rights for the received digital content may be determined based on the usage rights associated with the matching characterizing information in the database. In other words, the received digital content may be identified as including and/or corresponding to one or more of the protected media content files based on a comparison of their characterizing information.

At Block 525, results of the comparison are received from the validation server. Based on the received results, it is determined whether the digital content includes protected media content at Block 530. If the digital content does not include protected media content, unrestricted usage of the digital content (and/or usage based on any previously associated usage rights) is allowed at Block 535. The usage of the digital content is allowed for a predetermined period of time and/or number of uses, as determined at Block 537. For example, although the digital content may not be identified as including protected media content at a particular time, the database may be updated with protected media content corresponding to the digital content after the particular time. As such, the digital content may be periodically and/or intermittently re-validated by re-generating the characterizing information at Block 515 after predetermined periods of time and/or after a predetermined number of uses of the digital content.

However, if it is determined at Block 530 that the digital content includes protected media content, usage of the digital content is controlled based on the determined usage rights at Block 540. For example, when the digital content is determined to include protected media content whose technical protection measures have been circumvented, limited and/or trial usage of the digital content may be allowed. In addition, instructions for obtaining an authorized copy of the protected media content may be provided. However, if the received digital content is determined to be a copy of the protected media content whose release has been previously unauthorized, rendering and/or use of the received digital content may be prevented altogether.

As discussed above, it is to be understood that usage of the received digital content may be controlled at Block 540 directly and/or indirectly. More particularly, usage of the received digital content may be controlled at a particular electronic device by directly controlling operation of the device's media player and/or other rendering hardware/software. In addition and/or alternatively, usage of the received digital content may be controlled indirectly by altering the received digital content based on the determined usage rights to limit rendering and/or use thereof. For example, the received digital content may be locally encoded to associate the determined usage rights therewith. In other words, the determined usage rights may be obtained and locally applied to the received digital content to reinstate any technical protection measures that may have been altered and/or circumvented. In addition, instructions for obtaining a rights object and/or proper license that may be required to decode the encoded digital content may also be provided. Accordingly, usage rights may be determined and applied to the received digital content based on characterizing information derived therefrom to control unauthorized use thereof.

Figure 6:
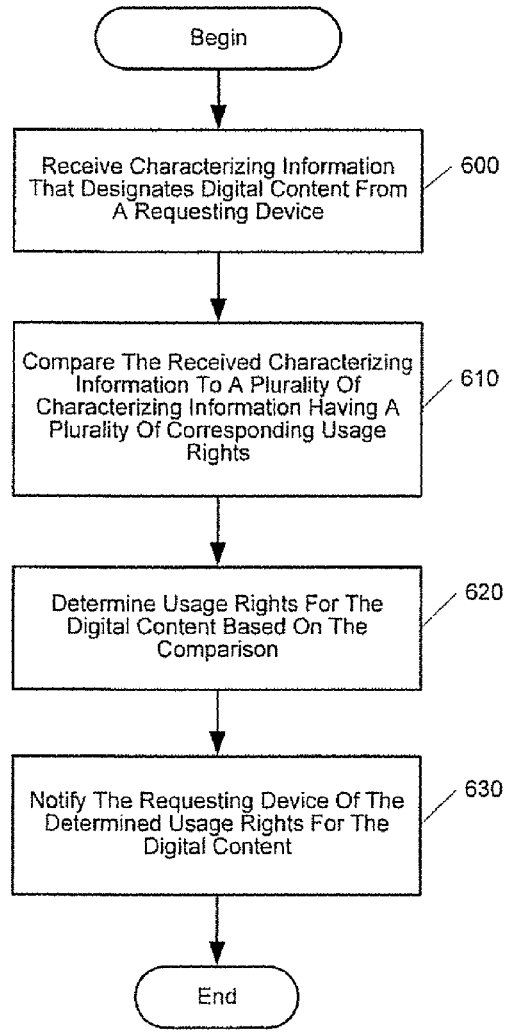

FIG. 6 is a flowchart illustrating operations for controlling unauthorized use of digital content according to further embodiments of the present invention. In some embodiments, the operations of FIG. 6 may be performed by a validation server, such as the validation server 110 of FIG. 1. Referring now to FIG. 6, operations begin at Block 600 when characterizing information that represents and/or designates particular digital content is received from a requesting device. For example, the requesting device may be a user device, such as the user device 105 of FIG. 1, which may have downloaded the particular digital content via the Internet and/or other network, such as the network 120. The received characterizing information is compared to a plurality of characterizing information having a corresponding plurality of usage rights at Block 610. For instance, the plurality of characterizing information may respectively designate a plurality of protected media content files, such as copyrighted, licensed, and/or otherwise protected media content having corresponding usage rights associated therewith. The characterizing information and the corresponding usage rights may be stored in a database. More particularly, the plurality of protected media content files and the associated usage rights may be received from a content owner, and the plurality of characterizing information may be generated from the plurality of protected media content files using a predetermined algorithm. As such, the database may be populated with the plurality of characterizing information and the corresponding plurality of usage rights. The requesting device may also be notified of the predetermined algorithm used to generate the characterizing information stored in the database prior to receiving the characterizing information designating the particular digital content.

At Block 620, usage rights for the particular digital content (designated by the received characterizing information) are determined based on the comparison at Block 610. For example, if the comparison indicates a match between the characterizing information received from the requesting device and at least one of the plurality of characterizing information stored in the database, it is determined that the digital content from the requesting device includes and/or corresponds to one or more of the protected media content files designated by the characterizing information stored in the database. In other words, the digital content from the requesting device may be identified as copyrighted, licensed, and/or other protected media content based on the comparison, and the usage rights for the digital content from the requesting device are determined based on the usage rights corresponding to the matching characterizing information. The plurality of characterizing information stored in the database may also designate known unauthorized copies of the protected media content files, such as bootleg copies and/or copies having a technical protection measure that has been altered/circumvented. As such, unauthorized copies of the protected media content files may also be identified, and appropriate usage rights may be determined based on the identification.

Still referring to FIG. 6, the requesting device is notified of the results of the comparison and/or of the determined usage rights for the particular digital content at Block 630. For example, when the requesting device is a user device, such as the user device 105 of FIG. 1, a notification may be transmitted to the requesting device over a wired and/or wireless connection thereto. In addition, the notification may include instructions for the requesting device to limit and/or prevent usage of the digital content based on the determined usage rights. For example, the instructions may notify a processor and/or media player associated with the requesting device to control usage of the digital content. In addition and/or alternatively, the instructions may notify hardware and/or software installed in the requesting device, such as the validation agent 107 of FIG. 1, to alter the digital content to limit rendering thereof, for instance, by locally encoding the digital content based on the determined usage rights. Thus, unauthorized use of the digital content by the requesting device may be controlled.

Figure 7:
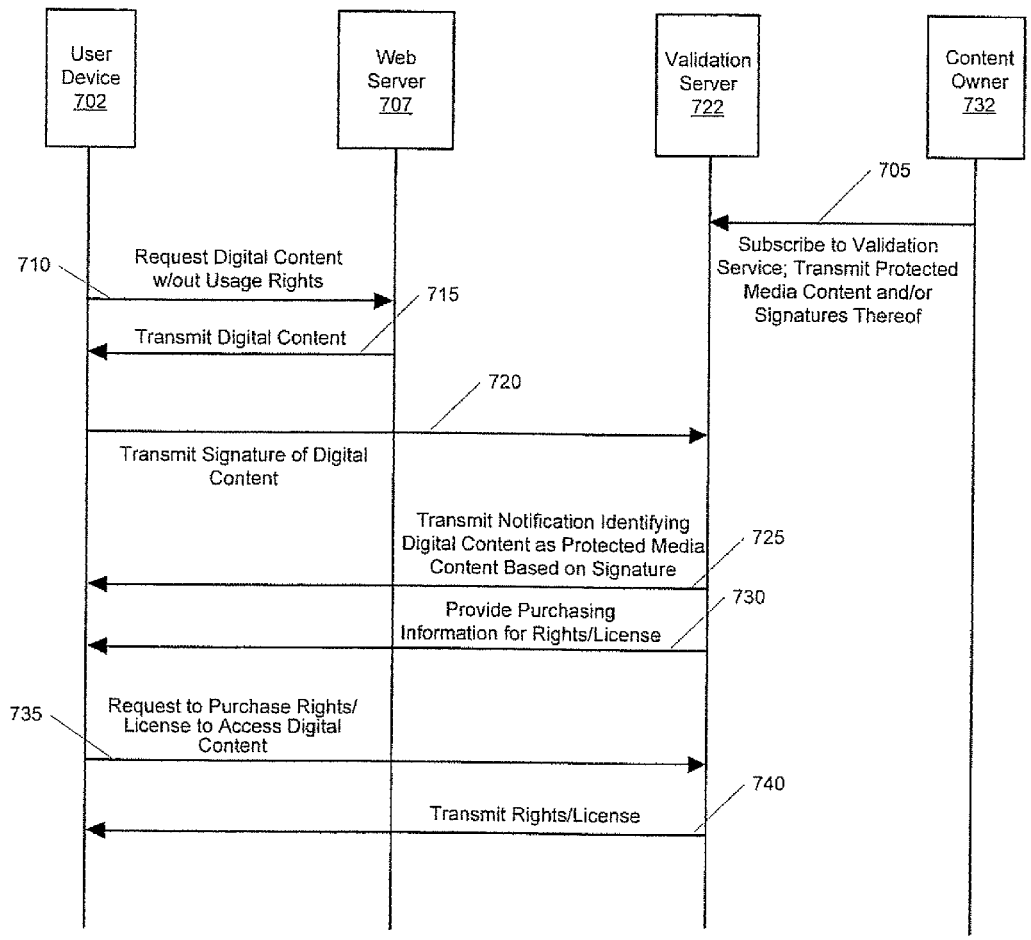
FIG. 7 is a flow diagram illustrating operations for controlling unauthorized use of digital content according to some embodiments of the present invention.

FIG. 7 is a flow diagram illustrating operations for controlling unauthorized use of digital content according to some embodiments of the present invention. Referring now to FIG. 7, operations begin when a content owner 732 subscribes to a validation service 705 provided by the validation server 722. As part of the subscription, the content owner 732 may transmit protected media content, signatures thereof and/or other characterizing information that designates the protected media content to the validation server 722. As such, the validation server 722 may create and populate a database with signatures and/or other characterizing information that designates the protected media content for which the content owner 732 wishes to prevent unauthorized use and/or distribution.

Still referring to FIG. 7, a request for digital content 710 is transmitted from a user device 702 to a web server 707. The requested digital content may be multimedia content, such as audio, video, and/or interactive gaming content. As such, the requested digital content may be an unauthorized copy of copyrighted, licensed, and/or otherwise protected media content. More particularly, in the following example, the requested digital content is a pirated copy of the DVD movie "Pirates of the Caribbean™". In other words, the requested digital content is a digital copy of the movie "Pirates of the Caribbean™" whose copy protection has been removed. As such, usage of this pirated copy is currently unrestricted, ie., the movie may be successfully rendered without the use of a corresponding rights object, license, and/or other DRM mechanism. Responsive to receiving the request for the digital content, the web server 707 transmits the requested digital content 715 to the user device 702. Upon receiving the digital content, the user device 702 notes that the digital content does not currently have usage rights associated therewith. As such, the user device 702 (and/or a validation agent therein) identifies the digital content for validation, generates a signature of the digital content using a predetermined algorithm, and transmits the signature of the digital content 720 to a validation server 722.

Responsive to receiving the signature of the digital content, the validation server 722 determines usage rights for the digital content based on the received signature. More particularly, the validation server 722 compares the signature of the digital content to the signatures of the protected media content provided by the content owner 732. Based on the comparison, the validation server determines that the signature received from the user device 702 matches the signature of an unauthorized copy of the movie "Pirates of the Caribbean™" provided by the content owner 732. As such, the validation server 722 determines usage rights for the digital content requested by the user device based on the usage rights specified by the content owner 732 for the unauthorized copy of "Pirates of the Caribbean™". More particularly, the validation server 722 determines that the digital content should not be viewable without a corresponding license. As such, the validation server 722 transmits a notification 725 to the user device 702 identifying the digital content as protected media content and specifying the usage rights therefor.

Upon receiving the notification, the user device 702 controls further rendering of the digital content (identified as an unauthorized copy of "Pirates of the Caribbean™"). For example, the user device 702 may instruct its media player and/or other hardware and/or software not to allow playback of the identified digital content. In addition, the user device 702 may encode the digital content such that it cannot be rendered without the appropriate license and/or rights object. The validation server 722 may provide instructions to the user device 702 as to how to encode and/or apply DRM to the digital content such that it may be successfully decoded using the license and/or rights. In other words, the user device 702 may locally apply DRM to the downloaded digital content to limit unauthorized use thereof based on the determined usage rights. In addition to the notification, the validation server 722 may also provide purchasing information for the license and/or rights required to decode the encoded digital content 730 to the user device 702, including payment options, conditions, and/or other relevant information regarding the purchase of a license to view the digital content.

Accordingly, as the user device 702 can no longer render the downloaded copy of "Pirates of the Caribbean™", a request to purchase the license to access the digital content 735 is transmitted to the validation server 722 (and/or the content owner 732) based on the purchasing information. Once payment has been received, the validation server 722 transmits the requested license 740 to the user device 702.

Thus, according to some embodiments of the present invention, usage rights for digital content may be determined based on characterizing information that represents and/or otherwise designates the digital content. More particularly, the digital content may be identified as including and/or corresponding to particular digital content, such as copyrighted, licensed, and/or other protected media content, based on the characterizing information designating the digital content, and usage rights for the digital content may be determined based on the identification thereof. Moreover, the determined usage rights may be locally applied to the digital content to limit further unauthorized use thereof, and a chain of distribution for the digital content may be determined based on device information appended thereto. Accordingly, usage of the digital content may be controlled, limited, and/or prevented based on the determined usage rights.

In the drawings and specification, there have been disclosed exemplary embodiments of the invention. However, many variations and modifications can be made to these embodiments without substantially departing from the principles of the present invention. All such variations and modifications are intended to be included herein within the scope of the present invention, as set forth in the following claims.

That which is claimed:

1. A method for controlling unauthorized use of digital content, the method comprising:
   identifying digital content stored in an electronic end user device for validation, wherein rendering of the digital content by the electronic end user device is currently unrestricted and does not require a corresponding Digital Rights Management (DRM) mechanism;
   generating, at the electronic end user device, a digital signature that designates the identified digital content stored therein responsive to identification thereof;
   determining, at the electronic end user device, usage rights for the identified digital content based on the digital signature thereof, wherein the usage rights specify rights for use of the digital content by the electronic end user device in which the digital content is stored;
   when a comparison of the digital signature that designates the identified digital content to a plurality of digital signatures in a database does not indicate a match therebetween, allowing usage of the identified digital content for a predetermined period of time and/or number of uses;
   when the comparison of the digital signature that designates the identified digital content to a plurality of digital signatures in a database indicates a match therebetween, determining, based on the usage rights, that the identified digital content corresponds to an authorized protected media content having circumvented technical protection measures;
   locally modifying, at the electronic end user device, the identified digital content based on the usage rights to reapply the circumvented technical protection measures to restore the identified digital content to correspond to the authorized protected media content; and preventing rendering of the digital content in response to the locally modifying.

2. The method of claim 1, wherein determining the usage rights comprises:

accessing the database including the plurality of digital signatures and a respective plurality of usage rights corresponding thereto; and determining the usage rights for the identified digital content based on the comparison of the digital signature that designates the identified digital content to the plurality of digital signatures.

3. The method of claim 2, wherein accessing the database comprises:

transmitting the digital signature that designates the identified digital content from the electronic end user device to a validation server coupled to the database; and receiving, at the electronic end user device, a notification from the validation server indicating and/or including the determined usage rights for the identified digital content stored therein.

4. The method of claim 2, wherein the plurality of digital signatures in the database comprises a plurality of digital signatures generated using a predetermined algorithm, and wherein generating the digital signature that designates the identified digital content comprises:

generating the digital signature that designates the identified digital content using the predetermined algorithm.

5. The method of claim 1, wherein determining the usage rights for the identified digital content based on the digital signature comprises:

comparing the digital signature that designates the identified digital content to a plurality of digital signatures having a plurality of usage rights respectively corresponding thereto; and determining the usage rights for the identified digital content based on the comparison.

6. The method of claim 5, further comprising:

receiving the digital signature that designates the identified digital content at a validation server configured to perform the comparison; and transmitting a notification indicating and/or including the determined usage rights for the identified digital content from the validation server to the electronic end user device based on the comparison.

7. The method of claim 5, wherein the plurality of digital signatures respectively designates a plurality of protected media content, and wherein determining the usage rights based on the comparison comprises:

determining that the identified digital content corresponds to at least one of the plurality of protected media content based on the comparison; and determining the usage rights for the identified digital content based on the usage rights corresponding to the digital signature that designates the at least one of the plurality of protected media content.

8. The method of claim 7, wherein the plurality of digital signatures further designates unauthorized copies of the plurality of protected media content and/or known variants thereof.

9. The method of claim 7, further comprising:

obtaining the plurality of protected media content;

generating the plurality of digital signatures respectively designating the plurality of protected media content responsive to obtaining the protected media content; and populating a database with the plurality of digital signatures responsive to generation thereof.

10. The method of claim 7, further comprising:

receiving the plurality of protected media content and/or the plurality of digital signatures from a subscriber device.

11. The method of claim 5, wherein the plurality of digital signatures respectively designates a plurality of unwanted digital content, and wherein determining the usage rights based on the comparison comprises:

determining that the identified digital content corresponds to at least one of the plurality of unwanted digital content based on the comparison; and determining the usage rights for the identified digital content based on the usage rights corresponding to the digital signature that designates the at least one of the plurality of unwanted digital content.

12. The method of claim 1, further comprising:

controlling usage of the identified digital content by the electronic end user device in which the digital content is stored based on the determined usage rights.

13. The method of claim 12, wherein controlling usage of the identified digital content comprises:

limiting rendering of the identified digital content based on the determined usage rights.

14. The method of claim 13, wherein limiting rendering of the identified digital content comprises:

altering the identified digital content based on the determined usage rights to limit rendering thereof.

15. The method of claim 14, wherein altering the identified digital content comprises:

encoding the identified digital content to associate the determined usage rights therewith such that subsequent rendering of the identified digital content by the electronic end user device is limited.

16. The method of claim 1, wherein generating the digital signature comprises:

sampling a portion of a waveform representing the identified digital content.

17. The method of claim 1, further comprising:

appending device information to the identified digital content responsive to determining the usage rights therefor, wherein the appended device information identifies the electronic end user device as having an unauthorized copy of the digital content stored therein.

18. The method of claim 17, further comprising:

identifying the device that has received the identified digital content based on the appended device information therein; and notifying a party associated with the identified digital content of the identified device.

19. The method of claim 1, wherein identifying the digital content for validation comprises:

identifying the digital content as without valid usage rights associated therewith.

20. The method of claim 1, wherein identifying the digital content for validation comprises:

identifying a file type of the digital content, and wherein generating the digital signature comprises generating the digital signature based on the identified file type.

21. A computer program product, the computer program product comprising a non-transitory computer usable storage medium having computer-readable program code embodied in the medium, the computer readable program code executed by a processor, which causes the processor to perform:

identifying digital content stored in an electronic end user device for validation, wherein rendering of the digital content by the electronic end user device is currently unrestricted and does not require a corresponding Digital Rights Management (DRM) mechanism;

generating, at the electronic end user device, a digital signature that designates the identified digital content stored therein responsive to identification thereof;

determining, at the electronic end user device, usage rights for the identified digital content based on the digital signature thereof, wherein the usage rights specify rights for use of the digital content by the electronic end user device in which the digital content is stored;

when a comparison of the digital signature that designates the identified digital content to a plurality of digital signatures in a database does not indicate a match therebetween, allowing usage of the identified digital content for a predetermined period of time and/or number of uses;

when the comparison of the digital signature that designates the identified digital content to a plurality of digital signatures in a database indicates a match therebetween, determining, based on the usage rights, that the identified digital content corresponds to an authorized protected media content having circumvented technical protection measures;

locally modifying, at the electronic end user device, the identified digital content based on the usage rights to reapply the circumvented technical protection measures to restore the identified digital content to correspond to the authorized protected media content; and preventing rendering of the digital content in response to the locally modifying.

22. An electronic end user device comprising:

a memory and a processor coupled to the memory, the memory including computer executable instructions that, when executed by the processor, cause the processor to perform:

identifying digital content stored in an electronic end user device for validation, wherein rendering of the digital content by the electronic end user device is currently unrestricted and does not require a corresponding Digital Rights Management (DRM) mechanism;

generating, at the electronic end user device, a digital signature that designates the identified digital content stored therein responsive to identification thereof;

determining, at the electronic end user device, usage rights for the identified digital content based on the digital signature thereof, wherein the usage rights specify rights for use of the digital content by the electronic end user device in which the digital content is stored;

when a comparison of the digital signature that designates the identified digital content to a plurality of digital signatures in a database does not indicate a match therebetween, allowing usage of the identified digital content for a predetermined period of time and/or number of uses;

when the comparison of the digital signature that designates the identified digital content to a plurality of digital signatures in a database indicates a match therebetween, determining, based on the usage rights, that the identified digital content corresponds to an authorized protected media content having circumvented technical protection measures;

locally modifying, at the electronic end user device, the identified digital content based on the usage rights to reapply the circumvented technical protection measures to restore the identified digital content to correspond to the authorized protected media content; and preventing rendering of the digital content in response to the locally modifying.

* * * * *